(12) United States Patent
Wang et al.

(10) Patent No.: US 8,703,011 B2
(45) Date of Patent: Apr. 22, 2014

(54) LIQUID CRYSTALLINE POLYESTER COMPOSITIONS

(76) Inventors: Xiuzhen Wang, Shanghai (CN); Haishan Bu, Shanghai (CN); Wen Zhou, Shanghai (CN)

( * ) Notice: Subject to any disclaimer, the term of this patent is extended or adjusted under 35 U.S.C. 154(b) by 0 days.

(21) Appl. No.: 13/054,058

(22) PCT Filed: Nov. 17, 2009

(86) PCT No.: PCT/CN2009/001271
§ 371 (c)(1),
(2), (4) Date: Jun. 7, 2011

(87) PCT Pub. No.: WO2010/102433
PCT Pub. Date: Sep. 16, 2010

(65) Prior Publication Data
US 2011/0233462 A1    Sep. 29, 2011

(30) Foreign Application Priority Data
Mar. 13, 2009  (CN) .......................... 2009 1 0047546

(51) Int. Cl.
C09K 19/38      (2006.01)
C08G 63/60      (2006.01)
C08L 67/00      (2006.01)
C09K 19/54      (2006.01)

(52) U.S. Cl.
USPC ................... 252/299.01; 252/299.5; 528/190; 528/193; 528/194; 528/272

(58) Field of Classification Search
USPC ............... 252/299.01, 299.5, 299.62, 299.67; 528/190, 193, 194, 272
See application file for complete search history.

(56) References Cited

U.S. PATENT DOCUMENTS 4,318,841 A    3/1982  East et al.
4,370,466 A    1/1983  Siemionko
(Continued)

FOREIGN PATENT DOCUMENTS

CN    1597728    3/2005
CN    1760232    4/2006
(Continued)

OTHER PUBLICATIONS

English translation by computer for JP 5-117915 (1993), http://www4.ipdl.inpit.go.jp/Tokujitu/PAJdetail.ipdl?N0000=60&N0120=01&N2001=2&N3001=H05-117915.*
(Continued)

Primary Examiner — Shean C Wu
(74) Attorney, Agent, or Firm — Squire Sanders (US) LLP

(57) ABSTRACT

The present invention provides a class of thermotropic liquid crystalline polyesters (TLCPs) and molding compositions comprising the polyesters and glass fiber. The TLCPs consist essentially of repeat units derived from p-hydroxybenzoic acid (HBA), 6-hydroxy-2-naphthoic acid (HNA), terephthalic acid (TA), and hydroquinone (HQ), and the mole percent of HBA, HNA, TA and HQ is 34-72%, 12-26%, 4-21% and 4-21%, respectively. The TLCPs have a melting temperature equal to or below 355° C., an inherent viscosity of 4.0-10.0 dL/g and a Heat Deflection Temperature (HDT) in the range of 260-285° C. when compounded with 30% by weight glass fiber. The optimum compositions, selected from the above-mentioned compositional ranges exhibit a relatively low melting temperature and a relatively high HDT. Specified compositions, selected from the above-mentioned compositional ranges have low melting point, which are useful to blend with conventional polymers such as poly (ethylene terephthalate) and nylon etc.

10 Claims, 2 Drawing Sheets

(56) References Cited

U.S. PATENT DOCUMENTS

| | | |
|---|---|---|
| 4,473,682 A | 9/1984 | Calundann et al. |
| 5,015,722 A | 5/1991 | Charbonneau et al. |
| 6,306,946 B1 | 10/2001 | Long et al. |
| 6,656,386 B2 | 12/2003 | Suenaga et al. |

FOREIGN PATENT DOCUMENTS

| | | | |
|---|---|---|---|
| CN | 1890289 | | 1/2007 |
| CN | 101233168 | | 7/2008 |
| JP | 05117915 | * | 5/1993 |
| JP | 2006-328141 | | 12/2006 |

OTHER PUBLICATIONS

English translation by computer provided by Dialog for CN 1597728 (2005).*

* cited by examiner

LIQUID CRYSTALLINE POLYESTER COMPOSITIONS

FIELD OF INVENTION

This invention relates to certain thermotropic liquid crystalline polyesters derived from p-hydroxybenzoic acid, 6-hydroxy-2-naphthoic acid, terephthalic acid, and hydroquinone, more specifically, relates to the manufacture of the polyesters as well as the correlation between composition and melt temperature of the polyesters.

TECHNICAL BACKGROUND

Thermotropic liquid crystalline polyesters (TLCPs) are high-performance materials with unique and remarkable combination of properties, such as excellent melt forming characteristics, high heat deflection temperature (HDT) and high mechanical strength, etc. They are useful as molding resins for general purpose uses, and in particular, for applications in the electrical and electronics industries. Also they can be useful as fiber and film for various applications, and as modifier for improving the properties of conventional polymers.

Polyester TLCPs derived from p-hydroxybenzoic acid (HBA), 6-hydroxy-2-naphthoic acid (HNA), terephthalic acid (TA), and hydroquinone (HQ) are known, see for instance U.S. Pat. No. 4,219,461. However, the relationship between composition and melting temperature of the TLCPs is not mentioned in the patent, and the melting temperature of the TLCP actually made is not high enough and then high HDT cannot be expected.

U.S. Pat. No. 4,318,841 describes a TLCP with repeat units derived from HBA, HNA, TA and resorcinol (m-HQ). U.S. Pat. No. 4,370,466 describes a TLCP with repeat units derived from HBA, HNA, IA (isophthalic acid), and HQ. In both cases, the repeat units with non-symmetrical in structure are introduced into main chain. In U.S. Pat. No. 4,473,682, 4,4'-biphenol (BP) was used to synthesize TLCPs in combination of HBA, HNA and TA, and the resulting TLCPs may have better thermal properties. U.S. Pat. No. 5,015,722 reported the synthesis of the TLCPs derived from HBA, HNA, TA, BP and HQ, which have a high HDT and a relatively low melting temperature. All these patents do not mention the correlation between composition and melting temperature of the polyesters.

U.S. Pat. No. 6,306,946 reported the preparation of TLCPs derived from HBA, TA, HQ and 2,6-naphthalenedicarboxylic acid (NDA). An empirical equation was obtained on the basis of composition and melting point of the polymers, and a contour map of melting point vs. polymer composition was prepared. But TLCP mentioned in the patent has a significant difference in structure from the TLCP of this invention.

For TLCP applications in the electrical and electronics industries, the melting temperature of TLCP is usually required to be high enough to insure high HDT and low enough for better processibility. A correlation between composition and melting temperature is of interest to establish the optimum compositional range for better processibility and high HDT. On the other hand, when TLCP is used to modify conventional polymers, the melting point has to be much lower to match that of the polymers, so that melt mixing can be performed. In the present paper, therefore, a series of TLCPs were synthesized with units derived from p-hydroxybenzoic acid (HBA), 6-hydroxy-2-naphthoic acid (HNA), terephthalic acid (TA) and hydroquinone (HQ) in a wide range of compositions, and the correlation between melting temperature and composition of the polyesters is established. According to the correlation, it is easier to design composition and to synthesize TLCP with desired melting temperature.

SUMMARY OF THE INVENTION

This invention concerns liquid crystalline polyesters consisting essentially of repeat units of the formula:

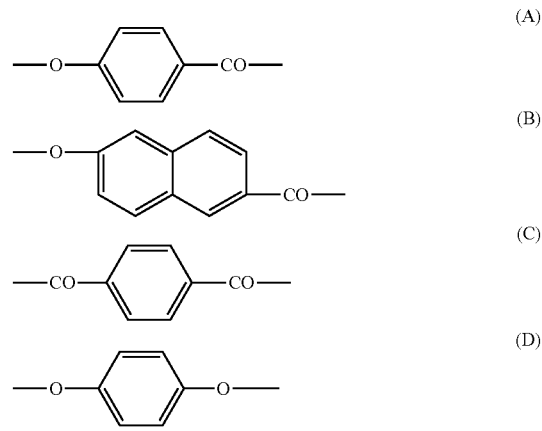

wherein the mole percent (mole %) ranges of (A), (B), (C), and (D) are 25-72%, 12-30%, 4-25%, and 4-25%, respectively. For any combination of (A), (B), (C), and (D) in the compositional ranges, the mole percent of (C) and (D) is equal to each other, and the total mole percent of (A), (B), (C), and (D) is 100%.

Disclosed is an inherent correlation between composition and melting point: the variation in melting temperature of TLCPs with increasing mole % of A clearly exhibits eutectic behavior at a constant mole % of B; the extrapolated eutectic temperature decreases linearly with increasing mole % of B. From experimental data, model equations related to composition and melting point were obtained, and they were used to develop a 3-dimensional plot of melting point vs. polymer composition.

According to the inherent correlation between composition and melting point, the optimum compositional ranges can be chosen to produce polyesters which have a relatively low melting temperature and a relatively high HDT when compounded with 30% by weight glass fiber.

It is preferred that the TLCPs are made with selected compositions from the range of 34-72 mole % A, 12-26 mole % B, 4-21 mole % C and 4-21 mole % D, and the said TLCPs have a melting temperature equal to or below 355° C. and a HDT in the range of 260-285° C.

It is particularly preferred that the TLCPs are made with selected compositions from the range of 54-69 mole % A, 13-14 mole % B, 9-16 mole % C and 9-16 mole % D, and the said TLCPs have a melting temperature equal to or below 345° C. and a HDT in the range of 275-285° C.

For TLCP application in modifying the properties of conventional polymers, such as nylon and poly (ethylene terephthalate) (PET) etc., according to the correlation between composition and melting point, the TLCPs are made with selected compositions from the range of 34-66 mole % A, 25-26 mole % B, 4-20 mole % C and 4-20 mole % D, and the said TLCPs have a melting temperature in the range of 250-280° C., enabling TLCP to blend with nylon or PET.

■, □, ▲, Δ, ♦, and ○ stand for melting point of polyesters with HNA mole percent of 12%, 14%, 18%, 20%, 25% and 30%, respectively.

Figure 2:
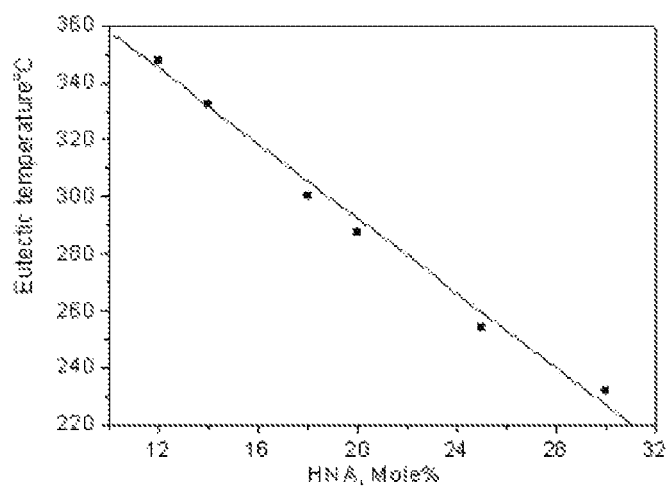

FIG. 2 is a plot of eutectic temperature vs. mole percent of HNA.

Figure 3:
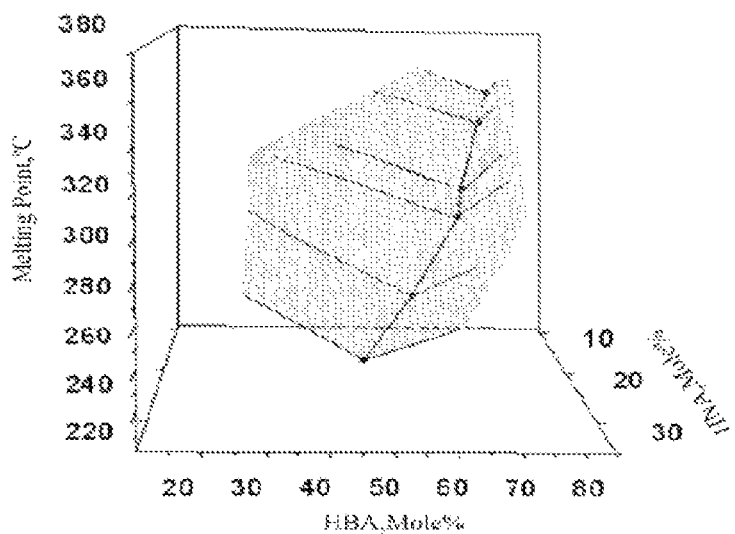

FIG. 3 is a plot of melting point vs. mole percent of HBA and HNA.

In the FIG. 3, the black lines from left to right stand for the fitting lines of melting points (experimental data), the black line from top to bottom is a connected line of eutectic points.

DETAILS OF THE INVENTION

In the TLCPs of the present invention, (A) is derived from p-hydroxybenzoic acid, (B) is derived from 6-hydroxy-2-naphthoic acid, (C) is derived from terephthalic acid, and (D) is derived from hydroquinone. By derived is meant the repeat unit is not necessarily the monomer used but is derived from it or a derivative of that monomer in the polymerization reaction.

In the TLCPs mentioned above, the mole percent (mole %) ranges of (A), (B), (C), and (D) are 25-72%, 12-30%, 4-25%, and 4-25%, respectively. In the compositional ranges, 6 series, and a total of 42 TLCPs were synthesized, as is listed below:

1. (B) is fixed at 12 mole %, (A) is 54 to 72 mole %, each of (C) and (D) is 8 to 17 mole %.
2. (B) is fixed at 14 mole %, (A) is 52 to 72 mole %, each of (C) and (D) is 7 to 17 mole %.
3. (B) is fixed at 18 mole %, (A) is 40 to 72 mole %, each of (C) and (D) is 5 to 21 mole %.
4. (B) is fixed at 20 mole %, (A) is 30 to 72 mole %, each of (C) and (D) is 4 to 25 mole %.
5. (B) is fixed at 25 mole %, (A) is 25 to 65 mole %, each of (C) and (D) is 5 to 25 mole %.
6. (B) is fixed at 30 mole %, (A) is 26 to 62 mole %, each of (C) and (D) is 4 to 22 mole %.

In each TLCP composition, the mole percent of (C) and (D) is equal to each other, and the total mole percent of (A), (B), (C), and (D) is 100%.

The use of hydroquinone in the synthesis of liquid crystalline polyesters presents a problem: hydroquinone diacetate, formed by acetylation reaction before polymerization reaction, can evaporate during the polymerization reaction, and the loss of even a small amount of the monomer can shift the stoichiometry of the reaction and lower the molar mass of the polymer significantly. Therefore, an excess hydroquinone is usually used to compensate for hydroquinone that evaporates from the reactor. In general, the mole ratio of D/C charged into the reactor is 1.0 to 1.10; preferably the mole ratio of D/C is 1.0 to 1.05, more preferably 1.0 to 1.02.

The TLCPs can be made by method well known in the art. A typical process of making the present TLCPs involves mixing an ester of HBA such as p-hydroxybenzoic acid acetate, a HNA ester such as 6-hydroxy-2-naphthoic acid acetate, a HQ diester such as hydroquinone diacetate, and TA, and then heating the resulting mixture to carry out polymerization, while distilling off the byproduct acetic acid. Alternatively, HBA, HNA, TA and HQ are mixed with a carboxylic anhydride such as acetic anhydride (AA), and heated to perform acetylation reaction. During this process, the hydroxyl groups of reactants are reacted with carboxylic anhydride, followed by evaporating of the byproduct acetic acid, and the desired esters are formed in situ. After acetylation is completed, the reactants are heated to a high temperature to initiate polymerization. Acetylation and polymerization can be done in one reactor or in separate reactors; in the latter case, acetylation is conducted in the first reactor, then the acetylated melt is transferred to a second reactor for polymerization. A similar process may be conducted by using phenolic esters of the TA together with HBA, HNA and HQ. The process is performed similarly to the acetate ester process except the phenol is formed as a byproduct.

Acetylation is generally carried out at temperature of 100-130° C. for about 1 h. From the beginning of the acetylation, reflux should be employed to prevent AA loss. The reactant mixture is then heated to 140-150° C., and the byproduct acetic acid begins to distill. With increasing temperature, acetic acid continually vaporizes from the reactor, but reflux returns AA back to the reactor. In order to complete the acetylation, the reaction mixture is further heated to 185-195° C., and remains at this temperature range until acetic acid stops distilling. In conducting the acetylation, an excess amount of acetic anhydride is usually utilized to ensure substantially completed reaction. Frequently, an excess of from about 1 to 10 mole percent of acetic anhydride, based on the total moles of hydroxyl groups present on HBA, HNA and HQ, is utilized. Preferably, an excess of from about 1 to 3 mole percent of acetic anhydride is used.

Temperature at which the polymerization begins is about 200-205° C., while the temperature reached in the final stage of the polymerization varies largely with the polymer being produced. In general, such temperatures are within about 320-380° C. for the TLCPs made in this invention. While kept at a high temperature, TLCP melt is subjected to vacuum, and the polymer is raised to the desired molar mass by continuing the polymerization process under heating and vacuum. For TLCPs having a very high melting point, it may be difficult to carry out melt polymerization at such a high temperature. In this case, low molar mass polymer (sometimes called a prepolymer) may be solidified and broken into small particles, and then the particles may be polymerized at a temperature below melting point by solid state polymerization to achieve a high molar mass of polyesters.

The polymerization reaction is generally conducted in the presence of a polymerization catalyst. Suitable catalysts include dialkyl tin oxide (e.g., dibutyl tin oxide), diaryl tin oxide, titanium dioxide, alkoxy titanium silicates, titanium alkoxides, and alkali and alkaline earth metal salts of carboxylic acids. The quantity of catalyst utilized is typically about 50 to about 500 parts per million, based on the total weight of the reactants from which the above-described repeat units are derived, excluding the acetic anhydride. Preferably the catalyst is an alkali metal salt of carboxylic acid, more preferably potassium acetate and potassium p-hydroxybenzoate. Preferably the quantity of catalyst is about 100-300 parts per million.

Inherent viscosity (I.V.) of the TLCPs is measured at 60° C. on a solution of 0.1 g/100 mL in pentafluorophenol. Commonly, I.V. may vary over a range from about 4.0 to about 10.0 dL/g, but lower I.V. is preferred due to more desirable proccessability. Suitable I.V. for high performance applications such as in circuit boards and injection-molded parts ranges from about 6.0 to about 8.0 dL/g.

The TLCPs of the invention may be mixed with other typical ingredients used in TLCP compounding to form TLCP compositions. Such materials include filler and reinforcing agents such as glass fiber, hollow or solid glass spheres, minerals such as clay, mica, talc and wollastonite, PTFE powders, carbon fiber, pigments such as carbon black and $TiO_2$, metal oxides and/or carbonates, inorganic fibrous materials such as silica, alumina, boron nitride, and potassium titanate fiber or fibrids, organic fibers such as aramid fiber, mold release and lubricants, and other polymers to form polymer blends. Particularly useful reinforcing agents are materials which are fibrous, and glass fibers are more preferred.

TLCP compositions typically can be made by adding ingredients into TLCP resin and melt kneading the mixture using the well known equipments such as a kneader, single screw extruder, twin screw extruder and the like at a temperature beyond the melting point of TLCP.

TLCP resin and TLCP compositions may be molded using a conventional melt forming process, including injection molding, extrusion (particularly to form sheet, film or profiles), blow molding and compression molding. When forming fibers, a process similar to the melt spinning of poly (ethylene terephthalate) can be used, and the resulting filamentary materials may be subjected to a thermal treatment whereby its physical properties are further enhanced.

Figure 1:
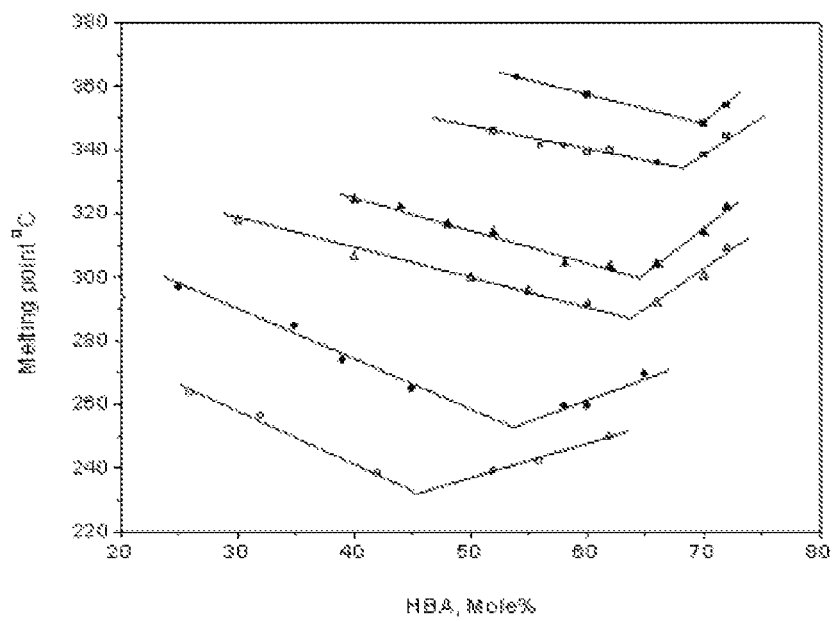
FIG. 1 is a plot of melting point vs. mole percent of HBA at various mole percent of HNA.

6 series with different mole percent of HNA and a total of 42 TLCP samples with different compositions were prepared. The compositions and melting points of the samples are listed in Table 1. The mechanical properties and HDT of the TLCPs were measured and several examples are shown in Table 2. FIG. 1 shows the eutectic melting behavior of the TLCPs: at a constant mole % of HNA, with the increase of mole % of HBA, the Tm decreases initially and then increases, passing through a region of low melting point. At each mole % of HNA, the extrapolation of two fitting lines of melting on both sides of the low melting region gives a minimum eutectic temperature, and FIG. 2 shows a linear decrease of the minimum eutectic temperature with increasing mole % of HNA. Model equations, related to composition and melting point of TLCPs, were obtained on the basis of the analysis of experimental data listed in Table 1 by using EXCEL and ORIGIN software, and a 3-dimensional plot of melting point vs. polymer composition was established, as shown in FIG. 3. Tm on the left hand of eutectic points was calculated by equation (1), which was obtained from experimental data in Table 1 using EXCEL and ORIGIN software, and is shown below:

$$T_m = (-0.841 + 0.0243 \times B - 0.00177 \times B^2) \times A + (-106.721n(B) + 671.7) \quad (1)$$

Tm on the right hand of eutectic points was calculated by equation (2), which was obtained from experimental data in Table 1 using EXCEL and ORIGIN software, and is shown below.

$$T_m = \left(1.203 + \frac{2.732 - 1.203}{1 + 10^{(B-20,457)}}\right) \times A + (-9462.023 + 2526.463 \times B - 256.916 \times B^2 + 12.64 \times B^3 - 0.302 \times B^4 + 0.0028 \times B^5) \quad (2)$$

EXAMPLES

Tests

The HDT was measured by ASTM Method D648, at a load of 1.82 MPa. Tensile Strength (TS), Tensile Modulus (TM) and Tensile Elongation at Break were measured by ASTM Method D638 at an extension rate of 5.1 mm/min using a Type 1 bar. In this test strain gauges were used to accurately measure elongation. Flexural Strength (FS) and Flexural Modulus (FM) were measured by ASTM Method D790. Izod impact strength (IS) was measured by ASTM Method D256. The melting point (Tm) of the polymers was measured by Differential Scanning calorimetry (TA Instruments DSC-910). The TLCP was first heated to a temperature about 20-30° C. above Tm, held for 3 min, and cooled to 150-200° C. Then the TLCP was again heated to a temperature above Tm. The peak temperature of the melting endotherm on the second scan was taken as Tm. The heating rate was 20° C./min, and the cooling rate was 10° C./min.

Preparation

Examples 1-4

For this series of TLCPs, the mole percent of HNA is 12%, and the compositions of this series are listed in Table 1. The preparation of the TLCP of Example 2 was chosen to describe the synthesis process. The amounts of monomers and acetic anhydride used for the synthesis of the polymer of Example 2 are shown below:

| | |
|---|---|
| p-hydroxybenzoic acid | 4475.09 g |
| 6-hydroxy-2-naphthoic acid | 1219.41 g |
| terephthalic acid | 1255.94 g |
| hydroquinone | 832.43 g |
| acetic anhydride | 5788.50 g |
| potassium acetate | 2 g |

A 30-L stainless reactor was utilized for acetylation and polymerization. The reactor was equipped with a stirrer and a unit for controlling agitator speed and monitoring torque. The reactor was further equipped with a vertical column for reflux of acetic acid, which was packed with Rasching rings and connected to a condenser and a receiver. A nitrogen source was connected to the reactor though a valve to maintain nitrogen purge during the reaction. A vacuum pump was provided to build molar mass in the final stage of the polymerization. An electrical heater was used to heat the reactor, and the temperature was precisely controlled.

The above-mentioned monomers and acetic anhydride were charged to the reactor, which was then purged by nitrogen three times to remove air. Then the reaction mixture was brought to a temperature of 120-130° C., with stirring, and held at that temperature for approximately 0.5-1 h. Over a period of 3 h, the temperature of the reactants was raised to 185-195° C., while acetic acid byproduct was driven off and collected in the receiver. The reactant mixture was held at 195° C. for about 15-30 min to complete acetylation.

The temperature of the reactants was then raised to about 200-205° C. to initiate polymerization, and then taken to about 350-360° C. over a period of 3 h, followed by distilling acetic acid byproduct. Thereafter, the condenser was removed and a vacuum system was connected to the top of the reflux column. The temperature was raised to 370-380° C. while the pressure was reduced to full vacuum (100-300 Pa) over a period of about 30 min. The reduced pressure was maintained until the stirring motor reached a fixed torque of 1.70-1.75 A (corresponding to an inherent viscosity of 7.0 to 8.0 dl/g) at an agitator speed of 60 rpm. Then, the agitator was stopped and nitrogen was pressed into reactor up to two of atmospheric pressure. The valve located below the reactor was opened to discharge TLCP melt into water. The melting point of the TLCP was measured by DSC to be 355° C., and it is listed in Table 1.

Other TLCPs of this series were prepared according to the same process and the melting point of the TLCPs was measured. Their composition and melting point are shown in Table 1.

Examples 5-12

The TLCPs of this series contain 14 mole % HNA. The preparation process is similar to Examples 1-4, except that the temperature was set at 360-370° C. and the torque was required to reach 1.65-1.70 A at the end of polymerization. The composition and melting point of this series are listed in Table 1.

Examples 13-21

The TLCPs of this series contain 18 mole % HNA. The preparation process is similar to Examples 1-4, except that the temperature was set at 330-355° C. and the torque was required to reach 1.40-1.45 A at the end of polymerization. The composition and melting point of this series are listed in Table 1.

Examples 22-29

The TLCPs of this series contain 20 mole % HNA. The preparation process is similar to Examples 1-4, except that the temperature was set at 330-350° C. and the torque was required to reach 1.25-1.35 A at the end of polymerization. The composition and melting point of this series are listed in Table 1.

Examples 30-36

The TLCPs of this series contain 25 mole % HNA. The preparation process is similar to Examples 1-4, except that the temperature was set at 325-340° C. and the torque was required to reach 1.20-1.25 A at the end of polymerization. The composition and melting point of this series are listed in Table 1.

Examples 37-42

The TLCPs of this series contain 30 mole % HNA. The preparation process is similar to Examples 1-4, except that the temperature was set at 320-330° C. and the torque was required to reach 1.10-1.20 A at the end of polymerization. The composition and melting point of this series are listed in Table 1.

The resulting TLCP was dried at 150° C. for 3-5 h, and then compounded with glass fiber on a 30 mm twin screw extruder. The extruder barrels and die were set at a temperature which is close to melting point of the TLCPs actually made in this invention, and the screws were run at 200 rpm. All materials were rear fed, and the compositions made contained 70 weight percent TLCP and 30 weight percent glass fiber. After exiting the extruder as strands the TLCP composition was cooled and cut into pellets. The pellets were dried at 150° C. for 3-5 h, and molded on an injection molding machine to prepare test pieces. The barrel and nozzle temperatures were also set at a temperature being close to melting point of the TLCPs made, the injection pressure was set at 20-40 MPa. The mold temperature was set at 90-110° C. The cycle time was 5-10 sec injection and 5-10 sec hold. The properties of the test samples were determined according to the methods mentioned above, and they are listed in Table 2.

TABLE 1

Composition and melting temperature of TLCPs

| Example | HBA (mole %) | HNA (mole %) | TA (mole %) | HQ (mole %) | $T_m$ (° C.) |
|---|---|---|---|---|---|
| 1 | 54 | 12 | 17 | 17 | 363 |
| 2 | 60 | 12 | 14 | 14 | 355 |
| 3 | 70 | 12 | 9 | 9 | 348 |
| 4 | 72 | 12 | 8 | 8 | 354 |
| 5 | 52 | 14 | 17 | 17 | 346 |
| 6 | 56 | 14 | 15 | 15 | 342 |
| 7 | 58 | 14 | 14 | 14 | 341 |
| 8 | 60 | 14 | 13 | 13 | 340 |
| 9 | 62 | 14 | 12 | 12 | 340 |
| 10 | 66 | 14 | 10 | 10 | 336 |
| 11 | 70 | 14 | 8 | 8 | 339 |
| 12 | 72 | 14 | 7 | 7 | 344 |
| 13 | 40 | 18 | 21 | 21 | 324 |
| 14 | 44 | 18 | 19 | 19 | 322 |
| 15 | 48 | 18 | 17 | 17 | 318 |
| 16 | 52 | 18 | 15 | 15 | 314 |
| 17 | 58 | 18 | 12 | 12 | 305 |
| 18 | 62 | 18 | 10 | 10 | 303 |
| 19 | 66 | 18 | 8 | 8 | 304 |
| 20 | 70 | 18 | 6 | 6 | 314 |
| 21 | 72 | 18 | 5 | 5 | 323 |
| 22 | 30 | 20 | 25 | 25 | 318 |
| 23 | 40 | 20 | 20 | 20 | 307 |
| 24 | 50 | 20 | 15 | 15 | 300 |
| 25 | 55 | 20 | 12.5 | 12.5 | 296 |
| 26 | 60 | 20 | 10 | 10 | 292 |
| 27 | 66 | 20 | 7 | 7 | 292 |
| 28 | 70 | 20 | 5 | 5 | 301 |
| 29 | 72 | 20 | 4 | 4 | 309 |
| 30 | 25 | 25 | 25 | 25 | 297 |
| 31 | 35 | 25 | 20 | 20 | 285 |
| 32 | 39 | 25 | 18 | 18 | 274 |
| 33 | 45 | 25 | 15 | 15 | 265 |
| 34 | 58 | 25 | 8.5 | 8.5 | 260 |
| 35 | 60 | 25 | 7.5 | 7.5 | 259 |
| 36 | 65 | 25 | 5 | 5 | 269 |
| 37 | 26 | 30 | 22 | 22 | 264 |
| 38 | 32 | 30 | 19 | 19 | 256 |
| 39 | 42 | 30 | 14 | 14 | 239 |
| 40 | 52 | 30 | 9 | 9 | 239 |
| 41 | 56 | 30 | 7 | 7 | 242 |
| 42 | 62 | 30 | 4 | 4 | 250 |

TABLE 2

Properties of TLCPs in examples

| Example | TS (MPa) | TM (MPA) | EB (%) | FS (MPa) | FM (MPa) | IS (J/m) | HDT (° C.) |
|---|---|---|---|---|---|---|---|
| 2 | 162 | 14400 | 2.0 | 225 | 15000 | 225 | 286 |
| 8 | 156 | 14000 | 2.0 | 239 | 15000 | 177 | 282 |
| 14 | 167 | 16000 | 2.0 | 238 | 13000 | 192 | 255 |
| 23 | 142 | 16400 | 1.7 | 241 | 15700 | 182 | 249 |
| 30 | 172 | 15000 | 1.9 | 279 | 18800 | 218 | 235 |
| 38 | 150 | 14200 | 1.8 | 271 | 18300 | 141 | 211 |

What is claimed is:

1. A class of liquid crystalline polyester consisting of repeat units of the formula:

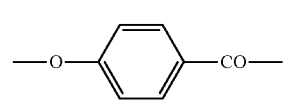

(A)

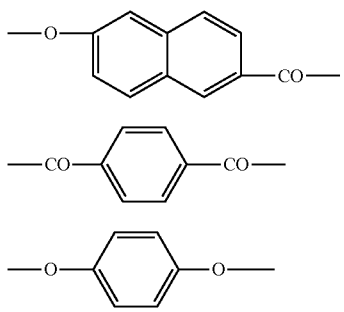

wherein the mole percent (mole%) of (A), (B), (C), and (D) are 34-72%, 12-26%, 4-21%, and 4-21%, respectively, for any combination of (A), (B), (C), and (D) in the compositional ranges, the mole percent of (C) and (D) is equal to each other, and the total mole percent of (A), (B), (C), and (D) is 100%;

said liquid crystalline polyesters have a melting point equal to or below 355° C., and an inherent viscosity of 6.0-10.0 dL/g, wherein the inherent viscosity is measured at 60° C. on a solution of 0.1 g/100 mL in pentafluorophenol, and wherein the polymerization temperature in the final stage of the polymerization is set to be within about 320-380° C.

2. The liquid crystalline polyester of claim 1 wherein the mole percent of (A), (B), (C) and (D) are 54-69%, 13-14%, 9-16% and 9-16%, respectively; and wherein the said liquid crystalline polyesters have a melting point equal to or below 345° C., and an inherent viscosity of 6.0-8.0 dL/g.

3. The liquid crystalline polyester of claim 1, wherein the mole percent of (A), (B), (C) and (D) are 34-66%, 25-26%, 4-20% and 4-20%, respectively; and wherein the said liquid crystalline polyesters have a melting point in the range of 250-280° C., and an inherent viscosity of 6.0-8.0 dL/g.

4. A polyester composition comprising said liquid crystalline polyesters of claim 1 and reinforcing agents, which are in fibrous or flaky form.

5. The polyester composition of claim 4, wherein said reinforcing agent is glass fiber in a mount of 30-50% by weight based on the total weight of said liquid crystalline polyesters and glass fiber.

6. The polyester composition of claim 5, wherein said glass fiber is present in a mount of 30% by weight based on the total weight of said liquid crystalline polyesters and glass fiber, and wherein said glass fiber has a diameter of about 12 microns and a length in-between 0.1-0.8 mm with an average of about 0.29 mm.

7. The polyester composition of claim 6, wherein the heat deflection temperature of the polyester compositions is in the range of 260-285° C.

8. The polyester composition of claim 6, wherein the heat deflection temperature of the polyester compositions is in the range of 275-285° C.

9. An injection-molded part comprising the polyester composition of claim 7.

10. A method of modifying poly(ethylene terephthalate) or nylon, comprising:
blending the liquid crystalline polyester of claim 1 with poly (ethylene terephthalate) or nylon.

* * * * *

UNITED STATES PATENT AND TRADEMARK OFFICE
CERTIFICATE OF CORRECTION

PATENT NO. : 8,703,011 B2
APPLICATION NO. : 13/054058
DATED : April 22, 2014
INVENTOR(S) : Bu et al.

It is certified that error appears in the above-identified patent and that said Letters Patent is hereby corrected as shown below:

Title Page, Item 12, delete: "Wang et al." and insert --Bu et al.--.

Title Page, Item 76, delete:

"Inventors: Xiuzhen Wang, Shanghai (CN); Haishan Bu, Shanghai (CN); Wen Zhou, Shanghai (CN)"

and insert:

--Inventors: Haishan Bu, Shanghai (CN); Xiuzhen Wang, Shanghai (CN); Wen Zhou, Shanghai (CN)--.

Signed and Sealed this
Eleventh Day of November, 2014

Michelle K. Lee
*Deputy Director of the United States Patent and Trademark Office*